Patented July 28, 1936

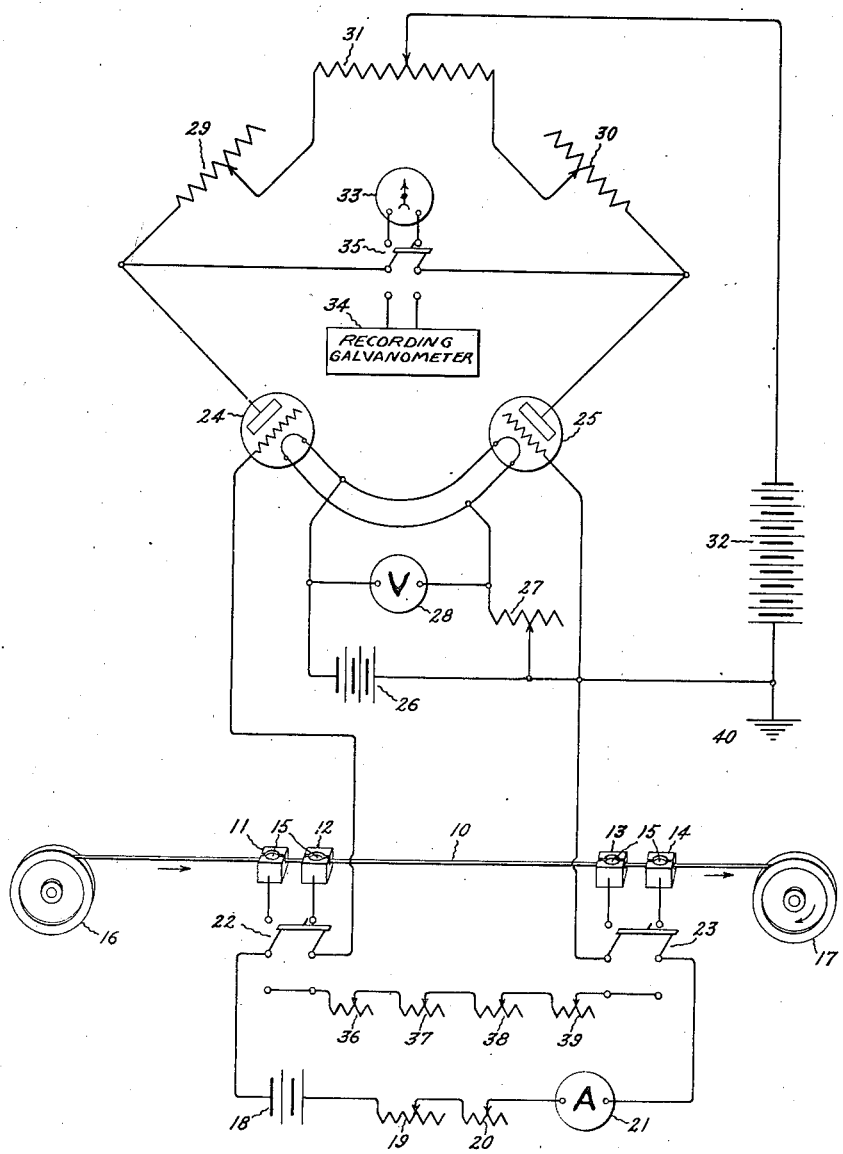

2,049,306

UNITED STATES PATENT OFFICE 2,049,306

METHOD AND APPARATUS FOR TESTING FILAMENT WIRE

Louis L. Matson, East Cleveland, Ohio, assignor to General Electric Company, a corporation of New York Application January 24, 1935, Serial No. 3,301

4 Claims. (Cl. 175—183)

My invention relates to methods and apparatus for testing wire as to electrical resistance and is particularly applicable to the testing of wire of the type used as filaments for incandescent lamps and similar devices. It is essential that such wire be extremely uniform in resistance and therefore it is essential that the testing method and apparatus be very sensitive. My method and apparatus are particularly adapted to furnish indications of the resistances of various sections of a spool of wire which is preferably run through the apparatus and uniformity may be determined by a comparison of said resistances. One of the preferred features of my invention is the employment of an instrument which makes a continuous record of said resistances as the wire passes through the apparatus, said record appearing as a line or curve and the more regular the said line, the more uniform the wire. Other features and advantages of my invention will be apparent from the apparatus shown in the drawing and from the description thereof which follows.

In the drawing Fig. 1 shows diagrammatically an apparatus embodying my invention including a wiring diagram therefor.

The wire under test is indicated at 10 and comprises a portion extending between the slots in blocks 11 and 12 and those in blocks 13 and 14. These blocks each hold a globule 15 of mercury within a well therein which contacts the wire 10 and permits longitudinal movement thereof. In testing a relatively long length of wire, said wire is preferably moved at a constant rate of speed and the readings of the testing apparatus recorded continuously. In such instances as shown, the wire passes off spool 16 through the mercury globules and onto spool 17. The testing apparatus makes connection to the wire either directly through the mercury globules or through the connection blocks holding the globules.

In starting the test the section of wire between contact blocks 11 and 14 is connected in an electric battery circuit comprising battery 18, resistances 19 and 20 and milliammeter 21 by throwing switches 22 and 23 into the up position. By the same movement of the switches the inner pair of contact blocks 12 and 13 are connected into the electrical Wheatstone bridge portion of the apparatus. Pairs of contact blocks are preferably used so that the bridge connections to the wire will be independent of the other connections made with the battery circuit. Contact block 12 is connected to the grid of the vacuum tube 24 and contact block 13 is connected to the grid of vacuum tube 25. The bridge circuit comprises the vacuum tubes 24 and 25, each in one half thereof, which have their filaments or cathodes connected in multiple and in a circuit comprising battery 26 and rheostat 27. The voltmeter 28 is connected between the filament leads which permits the rheostat to be adjusted so a known potential is applied to said filaments. The grids of both vacuum tubes 24 and 25 are connected to one of the filament leads, the former through the test wire and the battery circuit connected thereto. The plates of tubes 24 and 25 are connected through variable resistances 29 and 30 respectively to respective ends of the resistance of potentiometer 31, the adjustable contacting mechanism of which is connected to the battery 32. The battery 32 is also connected to the grid of tube 25 as shown. The test wire and the battery circuit connected thereto unbalance the bridge because of the negative grid bias produced thereby and the bridge must again be balanced since only changes in grid bias produced thereby are measured. The bridge is balanced with the test wire in place by adjustment of potentiometer 31 and resistances 29 and 30, said balance being indicated either by the galvanometer 33 or the recording galvanometer 34 which are connected between the plates of the tube as desired by manipulation of switch 35. Plus and minus readings are preferred, the zero being the mean for the wire. The specific recording galvanometer used is manufactured by the assignee and is of the type disclosed in Patent 1,897,850 issued February 14, 1933.

If the resistance of the test wire is to be measured in standard units, switches 22 and 23 are moved to the down position and the variable known resistances 36, 37, 38 and 39 are adjusted until the galvanometer reads as before. The values of the resistances 36, 37, 38 and 39 are preferably arranged in multiples of ten for convenience in adjusting and reading. The resistances 29 and 30 and potentiometer 31 are preferably of different values so as to provide different rates of adjustment. The sensitiveness of the device is controlled by the battery circuit which is connected to the test wire and the settings of rheostats 19 and 20 therein are the controlling factors thereof. The sensitiveness of the device at any particular setting of the rheostats may be determined by switching from the test wire to the resistances 36, 37, 38 and 39 and then comparing the galvanometer change for a given change in the known resistances. It is preferred that that portion of the circuit connected to the grid of vacuum tube 25 be grounded as shown at 40 and that the complete device be shielded from outside interference.

What I claim as new and desire to secure by Letters Patent of the United States is:

1. An apparatus for testing wire comprising a pair of spaced contacts for making electrical connection to said wire, a source of electrical potential connected through said contacts to that portion of the wire therebetween, means for moving said wire longitudinally so that all portions thereof are successively connected to said source, a Wheatstone bridge connected to said wire through said contacts comprising a pair of vacuum tubes having grids, plates and cathodes, each connected in one arm thereof, a galvanometer connected between said plates, a second source of potential having one lead connected to said plates and the other lead connected to said cathodes and to the grid of one of said vacuum tubes and a pair of variable resistances in each of the leads between the plates and said second source of potential for initially balancing said bridge, said bridge being connected to the wire under test through said contacts, one of which is connected to the grid of the other vacuum tube and the other of which is connected to said cathodes and caused to become unbalanced by non-uniform portions of the wire passing into position between said contacts.

2. A method of testing wire which consists in adjusting the grid of a three-electrode vacuum tube by using the said wire as a slide wire potentiometer so that the plate current of said tube is balanced against the plate current of a second three-electrode tube having a bridge relation with respect to the first tube, continuously moving the said wire longitudinally and determining the degree of unbalance between the said two tubes caused by the variations in the resistance of successive sections of said wire.

3. A method of testing wire which consists in impressing upon the grid of a three-electrode vacuum tube in one arm of a balanced electrical bridge an electromotive force produced by the flow of current from a battery through the said wire, continuously moving said wire longitudinally and determining by the amount of unbalance of the said bridge the variations in the resistance of successive sections of said wire.

4. An apparatus for testing wire comprising a pair of spaced contacts for making electrical connection to said wire, a source of electrical potential connected through said contacts to that portion of the wire therebetween, means for moving said wire longitudinally so that all portions thereof are successively connected to said source of potential, a Wheatstone bridge electrically connected to said wire and comprising a pair of three-electrode vacuum tubes each connected in one arm thereof, means for initially balancing the bridge and means for indicating the degree of unbalance thereafter as non-uniform portions of the wire pass between said contacts.

LOUIS L. MATSON.